United States Patent
Hardgrave et al.

(10) Patent No.: US 10,119,567 B2
(45) Date of Patent: Nov. 6, 2018

(54) METAL-BACKED PLAIN BEARING

(71) Applicant: GGB, Inc., Thorofare, NJ (US)

(72) Inventors: Adrian Hardgrave, Annecy (FR); Raphael Chantossel, Annecy (FR)

(73) Assignee: GGB, Inc., Thorofare, NJ (US)

( * ) Notice: Subject to any disclaimer, the term of this patent is extended or adjusted under 35 U.S.C. 154(b) by 208 days.

(21) Appl. No.: 14/577,964

(22) Filed: Dec. 19, 2014

(65) Prior Publication Data

US 2015/0132498 A1 May 14, 2015

Related U.S. Application Data

(62) Division of application No. 12/197,904, filed on Aug. 25, 2008, now Pat. No. 8,931,957.

(Continued)

(51) Int. Cl.
*F16C 33/20* (2006.01)
*B23P 15/00* (2006.01)
(Continued)

(52) U.S. Cl.
CPC .......... *F16C 33/208* (2013.01); *B05D 1/30* (2013.01); *B05D 1/42* (2013.01); *B23P 15/003* (2013.01);
(Continued)

(58) Field of Classification Search
CPC . B23P 15/003; B32B 15/092; B32B 2255/06; B32B 2264/108; B32B 2475/00; F16C 17/00–17/022; F16C 17/04; F16C 17/10; F16C 23/02–23/041; F16C 25/02–25/04; F16C 29/02; F16C 31/02; F16C 33/20; F16C 33/201; F16C 33/203; F16C 3/205; F16C 33/208; F16C 2202/52;
(Continued)

(56) References Cited

U.S. PATENT DOCUMENTS 2,865,692 A 12/1958 Grossman
3,205,086 A 9/1965 Brick et al.
(Continued)

FOREIGN PATENT DOCUMENTS

DE 1575362 1/1970
DE 2129256 1/1973
(Continued)

OTHER PUBLICATIONS

"American Elements—Graphite, Fluorinated, Polymer", American Elements, accessed Nov. 1, 2016, https://www.americanelements.com/graphite-fluorinated-polymer-51311-17-2.*
(Continued)

*Primary Examiner* — Matthew P Travers
(74) *Attorney, Agent, or Firm* — Perkins Coie LLP

(57) ABSTRACT

A bearing comprises a resin matrix filled with fluoropolymer, graphite, and other discrete particles of an additive material that is attached to a backing material. A method for manufacturing a bearing comprises depositing to a backing material a fluid polymer bearing material comprised of a resin matrix filled with fluoropolymer, various fillers, and discrete particles of an additive to form a continuous consolidated bearing material, and curing the lining material to bond the lining material onto the backing material.

17 Claims, 4 Drawing Sheets

Related U.S. Application Data

(60) Provisional application No. 60/935,678, filed on Aug. 24, 2007.

(51) Int. Cl.
 *B05D 1/30* (2006.01)
 *B05D 1/42* (2006.01)
 *F16C 17/02* (2006.01)

(52) U.S. Cl.
 CPC ............ *F16C 33/20* (2013.01); *F16C 33/201* (2013.01); *F16C 33/203* (2013.01); *F16C 33/205* (2013.01); *F16C 17/02* (2013.01); *F16C 2202/50* (2013.01); *F16C 2202/52* (2013.01); *F16C 2208/02* (2013.01); *F16C 2208/30* (2013.01); *F16C 2208/82* (2013.01); *F16C 2208/86* (2013.01); *F16C 2223/30* (2013.01); *Y10S 384/908* (2013.01); *Y10S 384/9071* (2013.01); *Y10T 29/4967* (2015.01); *Y10T 29/49636* (2015.01); *Y10T 29/49647* (2015.01); *Y10T 29/49668* (2015.01); *Y10T 29/49671* (2015.01); *Y10T 29/49677* (2015.01)

(58) Field of Classification Search
 CPC .............. F16C 2208/02; F16C 2208/82; F16C 2208/86; F16C 2223/30; F16C 2240/94; Y10T 29/49636; Y10T 29/49641; Y10T 29/49647; Y10T 29/49668–29/4967; Y10T 29/49671; Y10T 29/49677; Y10T 29/49705; Y10T 29/4971; Y10S 384/9074; Y10S 384/908
 See application file for complete search history.

(56) References Cited

U.S. PATENT DOCUMENTS

| | | | |
|---|---|---|---|
| 3,238,601 A | 3/1966 | White | |
| 3,684,062 A | 8/1972 | Johnson | |
| 3,826,301 A | 7/1974 | Brooks | |
| 4,156,046 A | 5/1979 | Lien et al. | |
| 4,156,049 A * | 5/1979 | Hodes | C08L 79/08 428/409 |
| 4,263,361 A | 4/1981 | Hodes et al. | |
| 4,857,080 A | 8/1989 | Baker et al. | |
| 5,056,937 A | 10/1991 | Tanaka et al. | |
| 5,091,098 A | 2/1992 | Tanaka et al. | |
| 5,229,198 A | 7/1993 | Schroeder | |
| 5,290,596 A | 3/1994 | Wegner | |
| 5,596,805 A | 1/1997 | Kunze et al. | |
| 5,631,085 A | 5/1997 | Gebauer | |
| 5,633,086 A | 5/1997 | Hsu et al. | |
| 5,755,883 A | 5/1998 | Kinose et al. | |
| 5,796,349 A | 8/1998 | Klein | |
| 6,305,847 B1 * | 10/2001 | Tanaka | F16C 33/201 384/297 |
| 6,425,977 B2 | 7/2002 | McDonald et al. | |
| 6,485,184 B1 | 11/2002 | Adachi et al. | |
| 6,629,829 B1 | 10/2003 | Shinoda et al. | |
| 7,887,922 B2 | 2/2011 | Mayston et al. | |
| 2001/0031596 A1 | 10/2001 | McDonald et al. | |
| 2002/0037992 A1 | 3/2002 | Niwa et al. | |
| 2002/0141671 A1* | 10/2002 | Narkon | F16C 33/10 384/322 |
| 2002/0195019 A1 | 12/2002 | Woodall | |
| 2003/0095729 A1 | 5/2003 | Post et al. | |
| 2003/0134141 A1* | 7/2003 | Okado | F16C 5/00 428/626 |
| 2003/0185474 A1 | 10/2003 | Tanaka et al. | |
| 2004/0008914 A1 | 1/2004 | Hiramatsu et al. | |
| 2004/0058825 A1 | 3/2004 | Iwata et al. | |
| 2004/0058828 A1* | 3/2004 | Iwata | C10M 111/04 508/104 |
| 2004/0112172 A1* | 6/2004 | Shimizu | F16C 17/045 75/228 |
| 2005/0157964 A1* | 7/2005 | Kawagoe | F16C 9/00 384/276 |
| 2005/0181194 A1 | 8/2005 | Haupert et al. | |
| 2005/0221110 A1 | 10/2005 | Fujita et al. | |
| 2007/0082825 A1 | 4/2007 | Kawakami et al. | |
| 2007/0141515 A1* | 6/2007 | Sekimoto | H05K 3/281 430/311 |
| 2007/0230846 A1 | 10/2007 | Tanaka et al. | |

FOREIGN PATENT DOCUMENTS

| | | | | |
|---|---|---|---|---|
| FR | 2159619 | | 3/2010 | |
| GB | 1415100 | | 5/2004 | |
| JP | 5881220 A | * | 5/1983 | .......... C09D 179/08 |
| JP | 61013025 | | 8/1987 | |
| JP | H0841484 A | | 2/1996 | |
| JP | 2001099169 A | | 4/2001 | |
| JP | 2003193084 A | | 7/2003 | |
| JP | 2007107589 A | | 4/2007 | |
| WO | WO-2006120025 A1 | | 11/2006 | |

OTHER PUBLICATIONS

"Engineering Toolbox—Densities of Solids", The Engineering Toolbox, accessed Nov. 1, 2016, https://www.engineeringtoolbox.com/densitysolidsd_1265.html.*

"Wolfram MathWorld—Sphere Packing", Wolfram MathWorld, accessed Nov. 3, 2016, https://www.mathworld.wolfram.com/SpherePacking.html.*

Translation of JPS5881220A.*

"Planar", Merriam-Webster, accessed Feb. 22, 2018, https://www.merriam-webster.com/dictionary/planar.*

Extended European Search Report re Application No. 08828768.5, dated Jan. 21, 2013. 7 pages.

International Searching Authority, "Notification of Transmittal of the International Search Report and the Written Opinion of the International Searching Authority," dated Feb. 12, 2009.

* cited by examiner

Impregnation Process
PRIOR ART

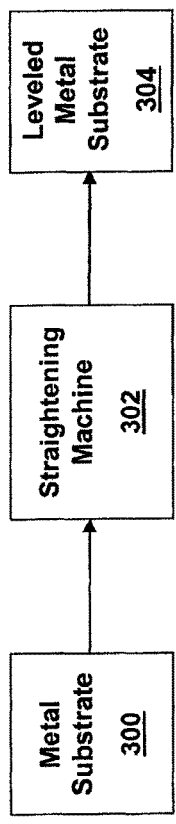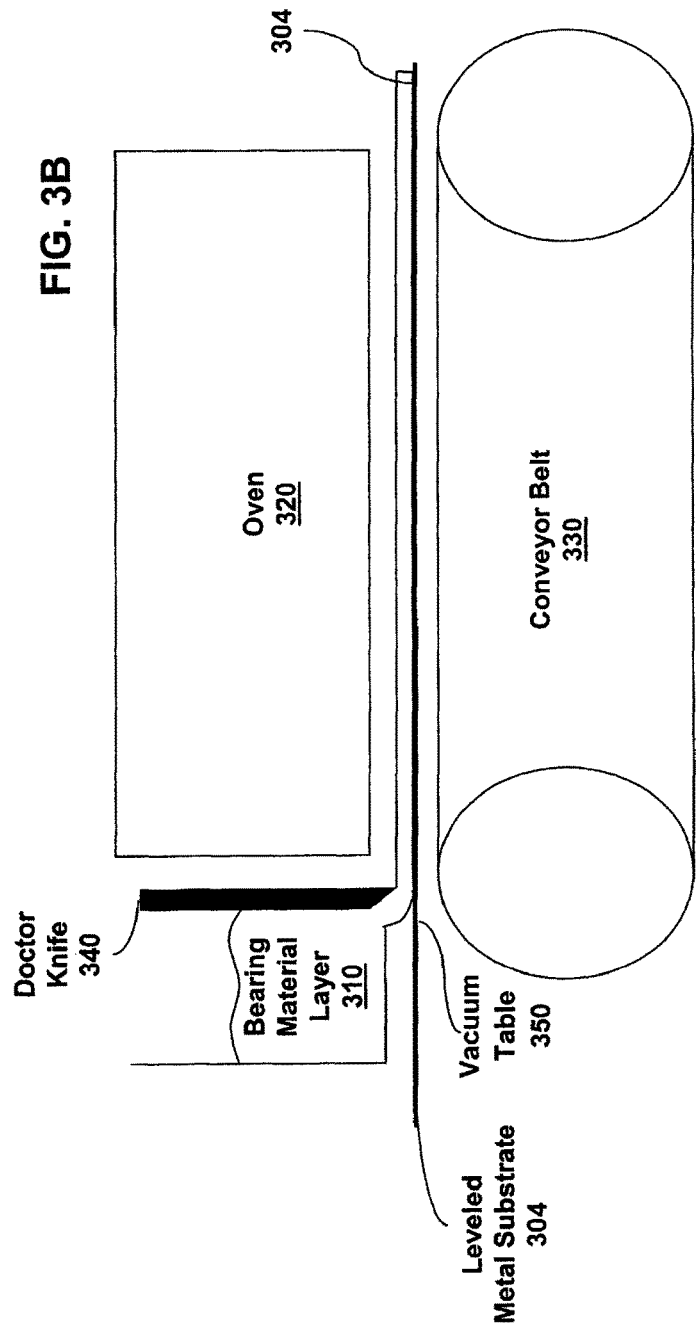

METAL-BACKED PLAIN BEARING

CROSS-REFERENCE TO RELATED APPLICATIONS

This application is a divisional of U.S. Utility patent application Ser. No. 12/197,904, filed on Aug. 25, 2008, which claims the priority benefit of U.S. Provisional Patent Application No. 60/935,678, entitled "METAL-BACKED PLAIN BEARING," and filed on Aug. 24, 2007, the entire disclosure of which is incorporated herein by reference.

BACKGROUND OF INVENTION

Field of Invention

The present invention relates generally to the field of plain bearings and materials for use therein. More specifically, the present invention relates to a low friction resin-based surface applied to a metal backing to form a high performance, self lubricated plain bearing.

Description of the Related Art

Conventional metal polymer plain bearings with polymer based sliding surfaces are typically composed of two-layer or three-layer composite bearing structures. Both forms rely on a metal backing to provide rigidity and allow the material to be formed into the appropriate shape, more commonly a cylinder. The metal polymer two-layer bearing materials typically rely on directly-applied or adhered polymers. The design of the three-layered bearing typically rely on an adhesive or porous metallic interlayer to attach the polymer bearing lining to the metal backing. In the latter, the porous metallic interlayer is often a critical part of providing the appropriate load bearing and tribological characteristics as well as functioning as a mechanical key.

Each of these bearings can be useful in dry applications where the use of externally supplied lubricants may be difficult or undesirable.

FIG. 1A shows a cross-section of a conventionally formed three-layer bearing. A porous metallic layer 100 is filled with polymer bearing material 110 and applied to a backing material 120, such as steel. The polymer bearing material 110 has a base polymer, such as polytetrafluoroethylene (PTFE) and filler particles. The porous metallic layer 100 typically has bronze or copper particles sintered to the backing material.

FIG. 1B shows a conventional process for impregnating a polymer bearing material into a porous metallic layer on a metal backing which typically includes spreading a paste or dry powder onto the porous metallic layer, and the paste or dry powder is compacted into the pores via rolling. The paste or dry powder may be made by mixing an aqueous dispersion of PTFE with a filler material, together with an organic lubricant, and coagulating the dispersion to form a "mush." Once the polymer bearing material is compacted into the porous layer, the backing material can be heated using a furnace to drive off any residual water and lubricant in the polymer bearing material.

The conventional porous metal layer of the three-layer bearing material is typically necessary for attaching the polymer bearing material to the metal backing in such a way as to make the bearing useful in highly loaded, demanding and substantially dry, non-lubricated environments. Without the porous metallic layer, the polymer material will not directly fuse with the metal backing as to provide sufficient strength, adherence or provide the necessary tribological properties, such as wear resistance, fatigue resistance, erosion resistance, low friction and self lubricity for use in highly loaded dry environments. There is a need to reduce the reliance on bronze in this bearing type in order to increase its corrosion resistance and ensure a more constant wear rate and level of friction over the operating life. As a result, there is a need for a metal-free method of fastening or applying the polymer bearing material to the metal backing without compromising the exceptional tribological properties (e.g. wear resistance) normally attained from the bronze/polymer surface combination.

SUMMARY

Conventional plain bearing layers contain metals, such as copper, a strategic raw material that is required to provide a mechanical key and strengthened support to the polymer matrix of the bearing lining allowing extended operating in highly loaded, dry operating conditions. A bronze metallic interlayer and steel backing can be susceptible to corrosion upon contact with some chemicals and moisture, even when commercially available anti-corrosion coatings such as zinc-nickel or tin flash are applied to the metal backing. Accordingly, a bearing described herein has been developed to eliminate the need for a porous bronze interlayer whilst maintaining similar levels of bearing strength, lining adhesion and self lubricated sliding properties as is normally expected from the three layer bearing structures. This bearing design comprises a resin matrix filled with fluoropolymer, graphite, and other discrete particles of an additive material that can be attached to a backing material.

The specific selection and mix of fillers with the resin matrix provides the desired blend of bearing properties such as wear resistance, fatigue and erosion resistance and low friction whilst maintaining sufficient flexibility for being formed into flanged cylindrical geometries without detriment to the adherence of the lining to the backing.

A method for manufacturing a bearing consists of depositing a fluid polymer bearing material composed of a resin matrix filled with fluoropolymer, various fillers, and discrete particles of an additive to form a continuous consolidated bearing material layer after curing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying exemplary figures wherein:

FIGS. 3A and 3B show a bearing manufacturing process according to an exemplary embodiment of the present invention.

DETAILED DESCRIPTION

Reference will now be made in detail to embodiments of the invention, one or more examples of which are illustrated in the accompanying attachments. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment of the invention can be used on another embodiment to yield a still further embodiment. Thus, it is intended that the present invention cover such modifications and variations that come within the scope of the invention.

Figure 1A:
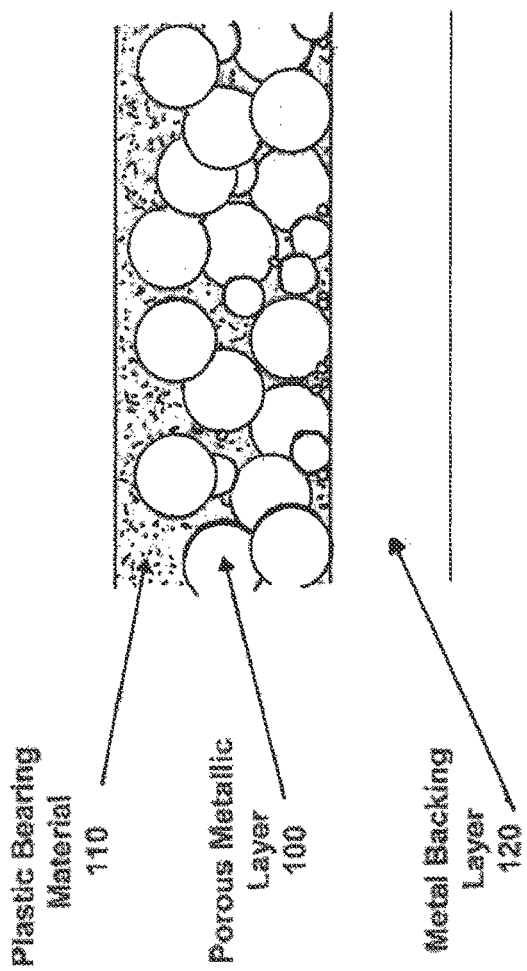
FIG. 1A shows a cross-section of a bearing made using a prior art method.
Figure 1B:
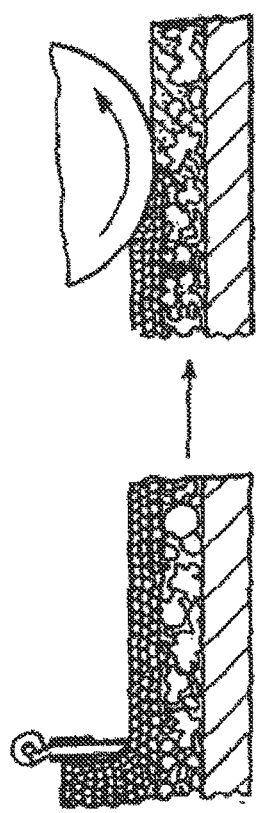
FIG. 1B shows a bearing manufacturing process according to an exemplary embodiment of a prior art method.
Figure 2:
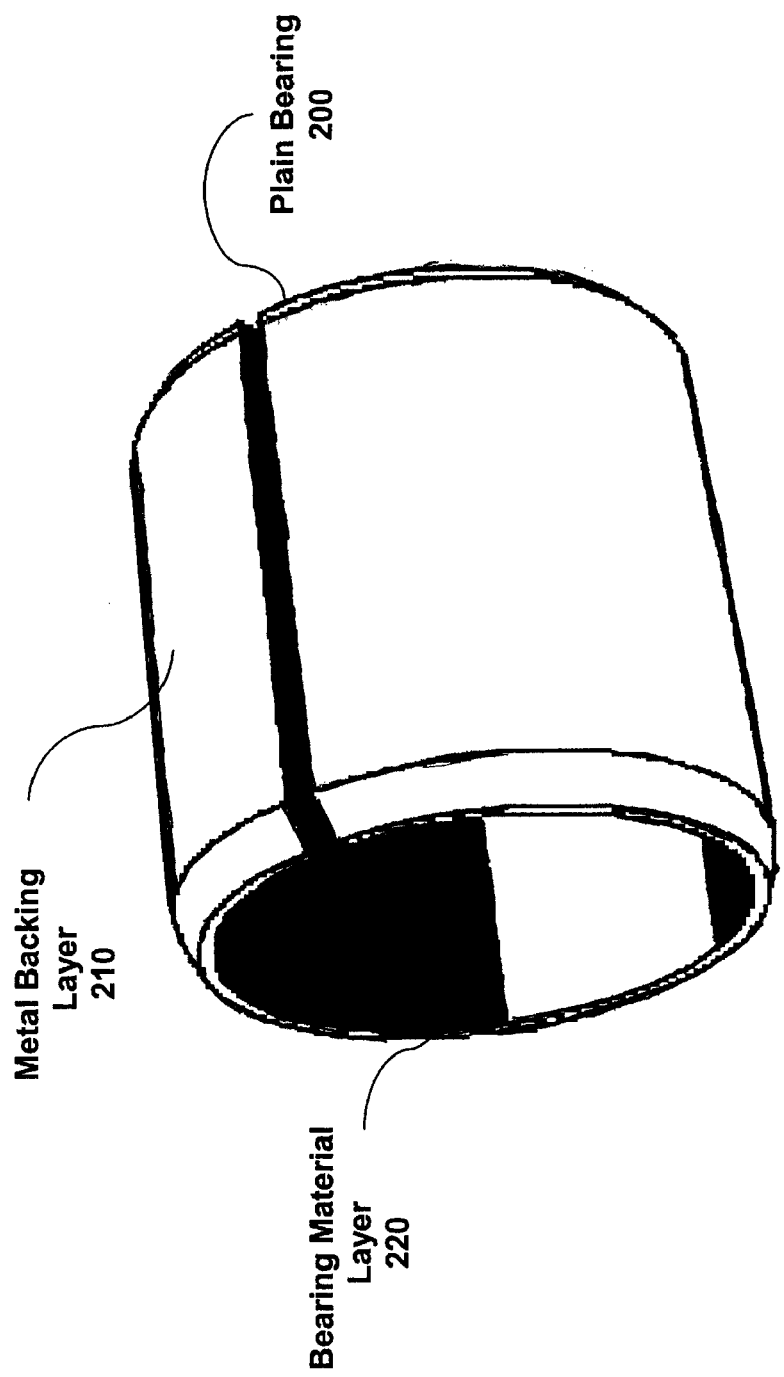
FIG. 2 shows a plain bearing according to an exemplary embodiment of the present invention.

FIG. 2 shows a plain bearing 200 having a metal backing layer 210 and a bearing material layer 220. The bearing material layer 220 can be a continuous consolidated structure comprising a curable resin mixed with a combination of fillers and discrete particles of additive materials.

The type of resin used can comprise any curable resin suitable for mixing with the fillers and additives. The resin used can be curable by use of air, heat, chemical reaction, or radiation. In one exemplary embodiment, the resin is an epoxide thermoset resin.

The fillers used can include fluoropolymers, such as polytetrafluoroethylene (PTFE), mono fluoro alkoxy, and fluorinated ethylene propylene; themoplastics, such as polyetheretherketone, polyphenylenesulphide, and polyamide; graphites or carbons, diamond powder, irregular carbon black, and fullerenes; strengthening fillers, such as calcium fluoride, barium sulfate, micro glass spheres, and ceramic powder; lubricating minerals, such as molybdenum disulphide and tungsten disulphide; lubricating fluids, such as silicone oils; fibers, such as carbon, glass, polymer, and PTFE; and fabrics or meshes, such as carbon, glass, polymer, and PTFE. In one embodiment, any amount or number of fillers can be included in the bearing material layer 220 so long as enough resin is present to form a continuous, consolidated bearing material layer 220.

The additive material can comprise any material suitable for incorporation into the filled resin such that the resulting bearing material layer 220 is disposed upon the backing material and operable to withstand the processing temperatures used to consolidate the bearing material layer and the mechanical loadings of the application. The additive material can include amine-based curing agents, such as, but not limited to, amines, anhydrides, acrylic copolymers (e-g., Disperbyk 2070) and boric acid esters (e.g., Byk W909). In a preferred embodiment, any amount of additive material can be included in the bearing material layer 220 so long as enough resin is present to form a continuous consolidated layer.

The metal backing layer 210 can comprise any material operable to support the bearing material layer 220 and withstand the processes of sintering the bearing material layer 220. In an embodiment, the metal backing layer 210 of the bearing can comprise a metal strip, e.g. low carbon steel strip. As yet another alternative, the metal backing layer 210 can comprise a metal strip being nickel or copper plated or covered with bronze sintered powder thereon to enhance adhesion of the bearing material layer 220, or a metallic mesh.

FIGS. 3A and 3B show an exemplary method for manufacturing plain bearings. First, a metal substrate 300, such as a steel sheet in coil form, is leveled by a straightening machine 302 to form the backing material 304.

An exemplary viscous bearing lining 310 can be prepared with a mixture of approximately 70 to 90% by volume of an epoxide thermoset resin, approximately 5 to 20% by volume of at least one fluoropolymer (e.g. approximately 12% by volume of PTFE), and approximately 1 to 8% of at least one other filler (e.g. 2% by volume of graphite), together with above-mentioned processing additive materials. The properties of the resulting bearing material layer can be tailored to suit different operating conditions by changing the amounts and types of fillers, as known to one of ordinary skill in the art.

The leveled metal substrate 304 can be kept flat by placing it on a vacuum table 350. In this position, the bearing material 310 is deposited onto the metal substrate 304 by gravity and is spread using a doctor knife 350, which is accurately positioned to give a constant thickness. The leveled metal substrate 304, which is now coated by the bearing material layer 310, is carried by a conveyor belt 330 through an oven 320 in order to dry and cross-link the bearing material layer 310 and ensure a sufficient bonding of the layer onto the metal substrate 304. The bearing material layer 310 can be optimized by adjusting thickness and/or temperature during curing to achieve desired properties.

Figure 4:
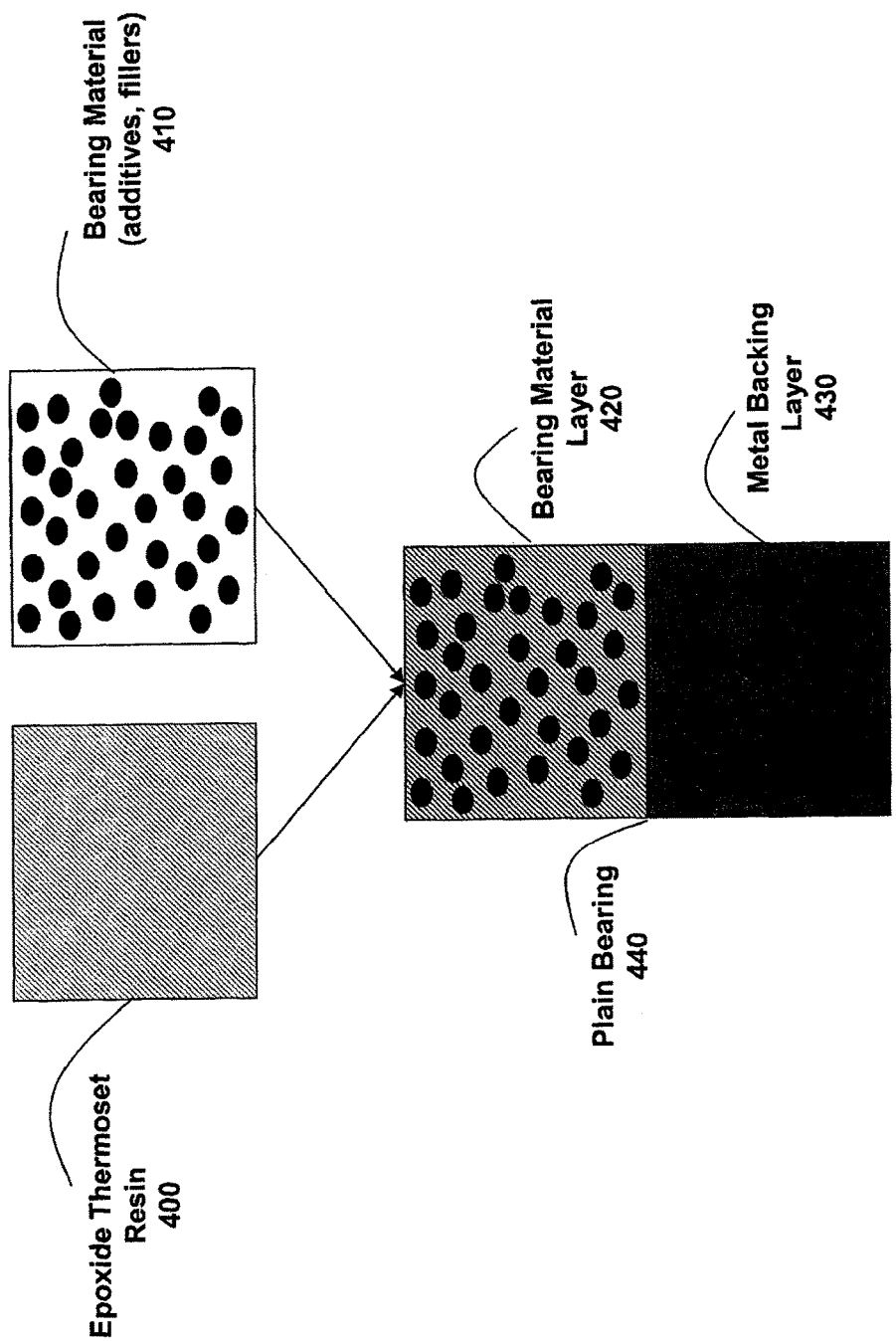
FIG. 4 shows a cross-section of a plain bearing according to an exemplary embodiment of the present invention.

FIG. 4 shows a cross-sectional view of a plain bearing. According to the exemplary process above, a viscous bearing layer 420 can be formed by mixing an epoxide thermoset resin 400 with a bearing material 410 that includes appropriate fillers, and additive materials. The bearing layer 420 can be cured to the metal backing layer 430, to form a plain bearing.

The embodiments described above are intended to be exemplary. One skilled in the art recognizes that numerous alternative components and embodiments that may be substituted for the particular examples described herein and still fall within the scope of the invention.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting h r n the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g., 1 to 8.3, and ending with a maximum value of 10 or less, e.g., 5.5 to 10, as well as all ranges beginning and ending within the end points, e-g., 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a" "an," and "the" include plural referents unless expressly and unequivocally limited to one referent.

What is claimed is:

1. A method for forming a plain bearing, comprising:
   providing a single layer metal substrate;
   leveling the single layer metal substrate to form a backing material;
   preparing a bearing lining material comprising a mixture of approximately 70 to 90% by volume of an epoxide thermoset resin, approximately 5 to 20% by volume of at least one fluoropolymer, and approximately 1 to 8% by volume of at least one other filler;
   depositing the bearing lining material directly onto the single layer metal substrate; and
   drying the bearing lining material to bond the bearing lining material directly onto the single layer metal substrate and to form a bearing lining material layer having a constant thickness; wherein the bearing lining material deposited directly onto the single layer metal substrate is free of solvent.

2. The method of claim 1, wherein the single layer metal substrate is a metal sheet in coil form, and wherein leveling comprises leveling by a straightening machine to form the backing material.

3. The method of claim 1, wherein the fluoropolymer comprises approximately 12% by volume of PTFE.

4. The method of claim 1, wherein the at least one other filler comprises approximately 2% by volume of graphite.

5. The method of claim 1, wherein the at least one fluoropolymer comprises PTFE.

6. The method of claim 1, wherein the at least one other filler comprises graphite.

7. The method claim 1, wherein the single layer metal substrate is placed on a vacuum table after being leveled and prior to depositing bearing lining material thereon.

8. The method of claim 1, wherein the method further comprises:
   leveling the bearing lining material after depositing the bearing lining material on the single layer metal substrate and prior to drying the bearing lining material.

9. The method of claim 1, wherein depositing the bearing lining material directly onto the single layer metal substrate comprises depositing the bearing lining material in an amount such that multiple layers of the at least one fluoropolymer and the at least one other filler are provided within the bearing lining material.

10. A method for forming a plain bearing, comprising:
    preparing a bearing lining material comprising a mixture of approximately 70 to 90% by volume of an epoxide thermoset resin, approximately 5 to 20% by volume of at least one fluoropolymer, and approximately 1 to 8% by volume of at least one other filler;
    depositing the bearing lining material directly onto a single layer metal substrate; and
    drying the bearing lining material to bond the bearing lining material directly onto the single layer metal substrate and to form a bearing lining material layer having a constant thickness; wherein the bearing lining material deposited directly onto the single layer metal substrate is free of solvent.

11. The method of claim 10, wherein the fluoropolymer comprises approximately 12% by volume of PTFE.

12. The method of claim 10, wherein the at least one other filler comprises approximately 2% by volume of graphite.

13. The method of claim 10, wherein the at least one fluoropolymer comprises PTFE.

14. The method of claim 10, wherein the at least one other filler comprises graphite.

15. The method claim 10, wherein the single layer metal substrate is placed on a vacuum table prior to depositing bearing lining material thereon.

16. The method of claim 10, wherein the method further comprises:
    leveling the bearing lining material after depositing the bearing lining material on the single layer metal substrate and prior to drying the bearing lining material.

17. The method of claim 10, wherein depositing the bearing lining material directly onto the single layer metal substrate comprises depositing the bearing lining material in an amount such that multiple layers of the at least one fluoropolymer and the at least one other filler are provided within the bearing lining material.

* * * * *